May 10, 1949.　　　　O. V. PHILLIPS　　　　2,469,571
FLIGHT POSITION INDICATORS FOR AIRCRAFT
Filed Nov. 2, 1945　　　　　　　　　　　　　2 Sheets-Sheet 1
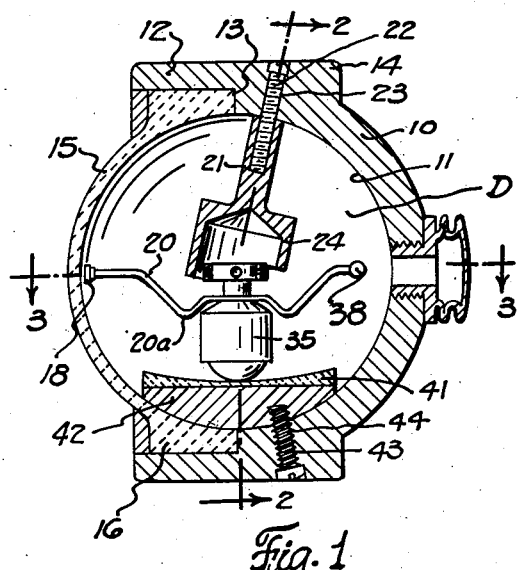
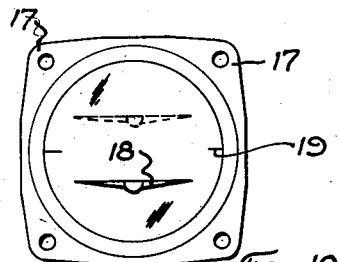
Fig. 10
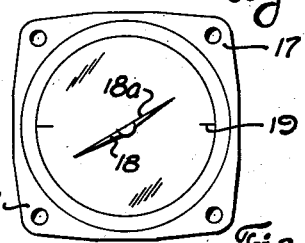
Fig. 11
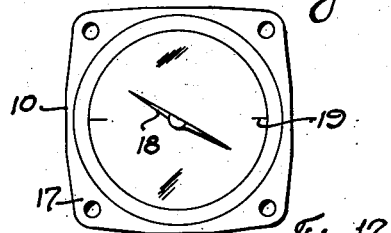
Fig. 12
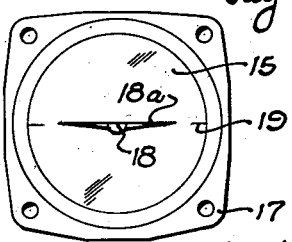
Fig. 13
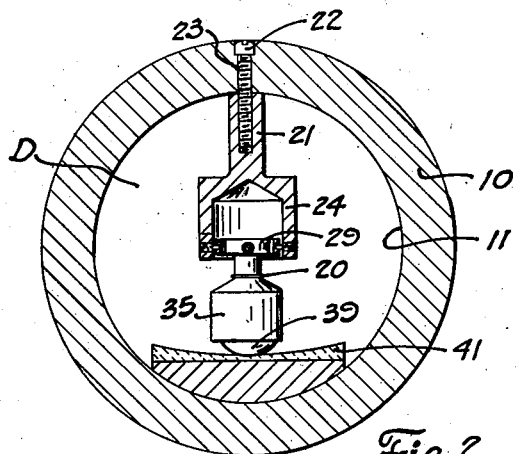
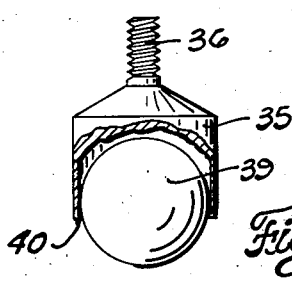
Oliver V. Phillips
INVENTOR.
BY Joe E. Edwards
ATTORNEY May 10, 1949.  O. V. PHILLIPS  2,469,571
FLIGHT POSITION INDICATORS FOR AIRCRAFT
Filed Nov. 2, 1945  2 Sheets-Sheet 2
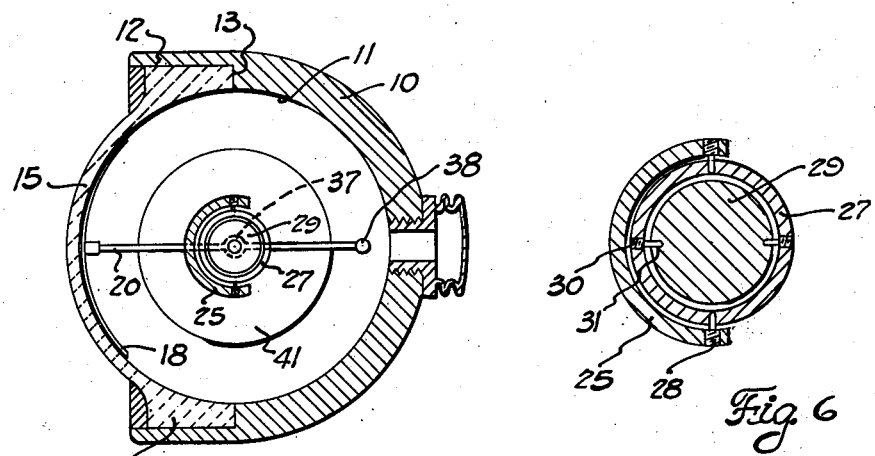
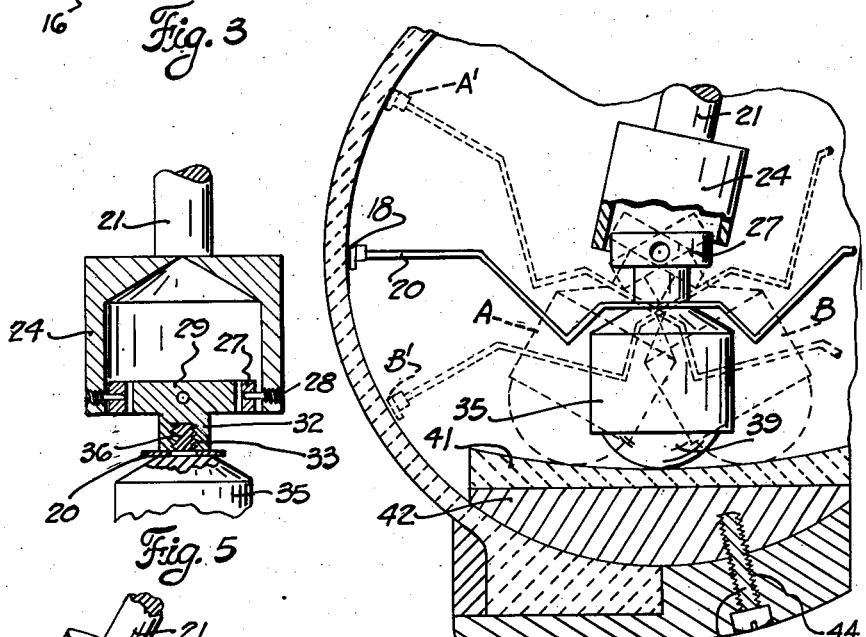
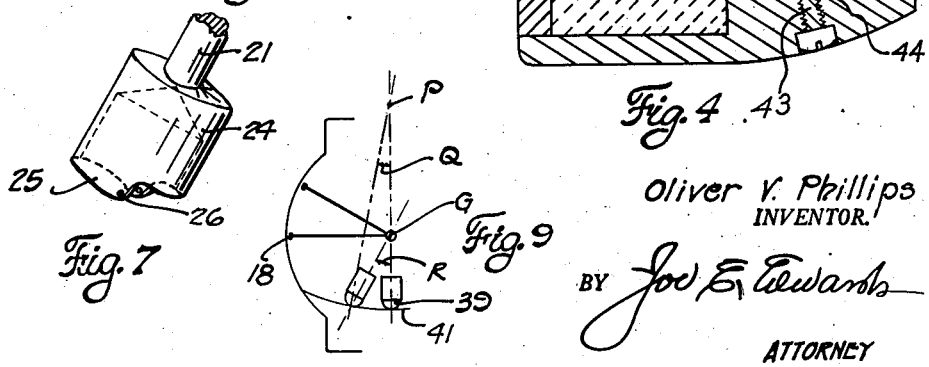
Oliver V. Phillips
INVENTOR.
BY Joe E. Edwards
ATTORNEY Patented May 10, 1949

2,469,571

UNITED STATES PATENT OFFICE 2,469,571

FLIGHT POSITION INDICATOR FOR AIRCRAFT

Oliver V. Phillips, Denver, Colo.

Application November 2, 1945, Serial No. 626,390

7 Claims. (Cl. 33—206)

This invention relates to new and useful improvements in flight position indicators for aircraft.

One object of the invention is to provide an improved flight indicating instrument for aircraft which is capable of indicating the nature of any variation of the position of the aircraft from a normal flight position, said instrument being extremely sensitive in operation and being immediately responsive to abnormal or incorrect positions of said craft in flight.

An important object of the invention is to provide an improved flight instrument having a mechanical indicating element which remains parallel to the transverse axis of the aircraft and in alignment with the horizontal center of the instrument so long as said aircraft is in proper flight position and irrespective of the particular flight maneuver, said indicating element being arranged to vary its parallel position with respect to the transverse axis of the aircraft or to vary its position in alignment with the horizontal center of the instrument upon a variation of said craft from a normal or correct flight position to indicate to the pilot that said aircraft is in an improper flight position.

A particular object of the invention is to provide an improved flight instrument, of the character described, having an indicator which is normally disposed in alignment with the horizontal center of the instrument and which will remain in such position during proper flight of the aircraft; said indicator being adapted to rotate about the center of the instrument to angularly misalign said indicator from its normal position and also being adapted to move either above or below the horizontal center line of the instrument to provide information and indications of improper flight positions of the aircraft.

A further object of the invention is to provide an improved aircraft instrument which will not only accurately indicate improper flight positions such as improper turn or bank, wing low position, etc., but will also indicate "nose high" and "nose low" positions; said instrument being constructed to also warn the pilot of an approaching stall when the forward speed of the aircraft falls below a safe speed while said aircraft is in a climbing maneuver.

Still another object of the invention is to provide an improved instrument of the character described wherein the indicating element is mounted to move in a vertical plane with respect to the face of the instrument and is also capable of rotation on a horizontal axis, said element being controlled in its actuation by a weight which is connected thereto; said weight having an improved connection with the indicator whereby the movement of said indicator, as controlled by said weight, is amplified to provide a substantial movement of the indicator upon a relatively small inclination of the aircraft from a normal flight position.

A particular object of the invention is to provide an improved flight instrument having a sensitive indicator bar for indicating improper flight position, said indicator being controlled in its movement by a weighted extensible member which is movable on a concavo-convex or dished support, the curvature of said support being greater than the radius of the member when said member is in a centered position and thereby making possible an amplified movement of the indicator bar and member when the forces acting on the aircraft are not acting directly through the center of gravity of said aircraft.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a transverse, vertical, sectional view of a flight position indicator, constructed in accordance with the invention, Figure 2 is a vertical, sectional view taken on the line 2—2 of Figure 1, Figure 3 is a horizontal, cross-sectional view taken on the line 3—3 of Figure 1, Figure 4 is an enlarged partial sectional view of the lower portion of the instrument and illustrating the action which imparts vertical movement of the indicator, Figure 5 is an enlarged, sectional detail illustrating the gimbal ring connection between the movable weighted assembly and its support, Figure 6 is an enlarged horizontal cross-sectional view through the gimbal ring assembly, Figure 7 is an isometric view of the gimbal support, Figure 8 is an enlarged view partially in section and partially in elevation of the tubular housing which carries the weighted ball member, Figure 9 is a schematic view illustrating the action of the weighted assembly in controlling movement of the indicator bar, and, Figures 10 to 13, inclusive, are front elevations of the instrument, showing the indicator in various positions to illustrate the indications given by the instrument in different flight positions.

In the drawings, the numeral 10 designates a casing or housing which forms the main body of the instrument. The casing is formed with a concavo-convex cavity or recess 11 and an annular flange 12 which is made integral with the casing and which extends forwardly from said cavity. At the intersection of the annular flange with the casing an annular shoulder 13 is formed. The top and bottom of the casing is preferably provided with integral bosses or enlargements 14 which, as shown in Figure 1, are disposed adjacent to the flange 12, said bosses being located diametrically opposite each other.

An arcuate transparent cover or dial member 15 which may be constructed of glass, plastic or other transparent material is adapted to close the forward end of the casing 10. The cover is formed with a widened annular portion 16 which portion is adapted to fit within the annular forwardly extending flange 12 with the edge of said portion abutting the internal shoulder 13. The cover may be cemented or otherwise secured in position closing the casing so as to provide an effective seal at its point of engagement with the shoulder; however, if desired, the cover may be removably secured to the casing by screws or in any other desired manner in which event a suitable packing gasket (not shown) would be interposed between the inner edge of the cover and the shoulder 13. Fastening ears or lugs 17 which have suitable screw or bolt openings therein are preferably formed integral with and extend outwardly from the annular flange 12, said ears or lugs facilitating the mounting of the casing 10 within the instrument panel of an aircraft. When the cover 15 is in position on the casing 10 it will be obvious that the inner surface of the cover co-acts with the concavo-convex cavity or recess 11 to form a substantially spherical chamber D within the instrument.

An indicating element or bar 18 is mounted within the chamber D and, as is clearly shown in Figures 1 and 3, the outer surface of the element or bar is contiguous or adjacent to the inner surface of the transparent cover or dial member 15. The indicating element or bar is generally curved or arcuate so as to substantially conform to the contour of the inner surface of the cover and as viewed from the front, the extremities of said element or bar terminate in sharp points. The indicating element is mounted to undergo movement in a vertical plane within the chamber A and is also mounted to rotate on a horizontal axis, as will be explained. The normal position of the indicating element or bar 18 is in alignment with the horizontal center line of the cover 15 as shown in Figure 13, in which position the pointed ends of the element are in alignment with indicating marks 19 which are suitably inscribed on the cover or dial member 15. As may be seen by observing Figures 10 to 13 the indications or marks 19 are diametrically opposite each other and denote the horizontal center line of the cover 15, and therefore, of the instrument.

In order to mount the indicating element or bar 18 to permit its movement in a vertical plane and also to allow said element to swing or rotate about a central horizontal axis, said element is suitably secured to the forward end of a supporting bar 20. For mounting the supporting bar, an inclined support or post 21 is located within the interior of the instrument and said support extends downwardly from the top of the chamber 11 to a point substantially in alignment with the center of said instrument. The upper end of the support or post is reduced and abuts the wall of the chamber 11, being secured in position by a fastening screw 22 which passes downwardly through an opening 23 in the case and which threads into said upper reduced end. The lower end of the support or post 21 is enlarged and is bored out as shown at 24. The extreme lower end of the support is provided with a depending semi-circular flanged portion 25 and the ends of this flanged portion which are diametrically opposite each other are provided with threaded openings 26. A gimbal ring 27 is arranged to be attached to the flanged portion 25 of the support by suitable gimbal screws 28 (Figure 5) and obviously the ring 27 may swing on the pivots formed by said screws.

A gimbal disk 29 is disposed within the gimbal ring 27 and is pivotally secured thereto by gimbal screws 30, these latter screws being threaded through openings in the ring and having their inner ends engaging recesses 31 in the peripheral edge of the disk. The gimbal screws 30 are located diametrically opposite each other and the axes of the screws 30 are disposed at a right angle to the axes of the gimbal screws 28 (Figure 6). This is the usual gimbal mounting arrangement and permits a universal movement or swinging of the disk 29 in any direction from the vertical axis or plane of the instrument casing.

The gimbal disk 29 is provided with a depending shank 32 and the lower portion of this shank is formed with an internally screw threaded bore 33. A weighted assembly which is adapted to be secured to the shank, as will be explained, includes a tubular housing or socket 35 which is provided with an upstanding threaded stud 36. The supporting bar 20 which has the indicator bar 18 secured to its forward end is formed with a collar 37 at its central portion and this collar is engageable over the upstanding stud 36 of the housing or socket 35. After engagement of the collar 37 of the supporting bar 20 with the stud, the stud is threaded into the depending shank 32 of the gimbal disk so that the supporting bar 20 and its indicating bar 18, as well as the socket or housing 35 are all suspended by the gimbal ring arrangement. The supporting bar 20 may be provided with offsets 20a to give it desired rigidity and to properly locate the indicator bar 18 at the horizontal center of the cover 15 when the instrument is level. The rear end of the supporting bar 20 may carry a suitable weight 38 which balances the assembly.

The tubular socket or housing 35 has a weighted ball 39 confined therein and said ball is retained from downward displacement by the inwardly directed lower edge 40 of the tubular housing. However, the ball 39 is freely rotatable within the housing and may also move upwardly therein. The ball 39 provides a weight which, as will be explained, is acted upon by gravity and said ball rides upon a concavo-convex or dished supporting plate 41. The plate 41 is secured to a suitable base 42 which is fastened within the lower portion of the instrument chamber by a fastening screw 43 which extends upwardly through an opening 44 in the casing 10 and threads into the underside of the base. The weight 39 rolls on the plate 41 so that the weight of said ball is not suspended from the gimbal screws which support the tubular housing 35 and the indicating bar assembly. However, any movement of the ball as it rolls on the plate 41 will be transmitted through the housing 35 to the indicator bar assembly and will result in a movement thereof.

It will be apparent that since the ball 39 is movable over the concavo-convex plate or support 41, said ball is capable of a universal movement with respect to the vertical center or axis of the instrument case. Whenever the instrument is level in a horizontal and vertical plane, the ball will be at the exact center of the plate 41, as shown in Figure 1, and in such position the indicating bar 18 will be aligned with the horizontal center of the transparent cover 15 as shown in Figure 13. Any inclination of the instrument in a vertical plane will cause the ball 39 to roll to one side or the other of the vertical center and will result in the indicator bar or element being inclined with respect to the horizontal center of the cover, as illustrated in Figures 11 and 12. Any inclination of the instrument in a horizontal plane will cause the ball 39 to roll forwardly or rearwardly of the vertical center of the instrument (Figure 4) and will result in the indicator bar being moved above or below the horizontal center of the transparent cover 15, as illustrated in Figure 10. Actually the indicator bar or element is suspended for universal movement within the instrument case by the gimbal ring arrangement and the movement of said indicator bar is controlled by the position of the ball 39 on the plate. It is, of course, apparent that the ball 39 is responsive to gravity and will assume its various positions on the curved plate 41 in accordance with the force of gravity acting thereon.

In the operation of the instrument, said instrument is suitably mounted within the instrument panel of the aircraft and the fastening ears or lugs 17 facilitate such mounting. The indicator bar and its support 20, as well as the tubular housing assembly on which it is mounted, is properly balanced so that when the aircraft is in a level position, that is, its normal flight position, the weighted ball 39 is at the exact center of the curved or dished supporting plate 41 and at this time the upper edge 18a of the indicator 18 is aligned with the horizontal center of the cover 15, with the pointed ends of said indicator aligned and adjacent the reference marks 19. So long as the aircraft is in a normal level flight the indicator remains in the position shown in Figure 13.

In the event that the aircraft is being flown in a forward direction with the nose of said aircraft high, the indicating element or bar 18 will assume the position shown in dotted lines in Figure 10, in which position the bar is above the horizontal center line of the instrument. A nose low position in forward flight will cause the indicating element or bar 18 to assume the position shown in full lines in Figure 10 which places said element or bar below the horizontal center line of the instrument. These indications will immediately advise the pilot of the incorrectness of the flight position.

The movement of the indicator bar to indicate the nose high or nose low position is effected by the movement of the weighted assembly within the instrument and the action is clearly illustrated in Figures 4 and 9. With the aircraft in a truly level flight position the ball 39 is at the center of the dished or curved plate 41 and the indicating bar or element 18 is aligned with the horizontal center of the cover 15; this position of the parts is shown in full lines in Figure 4. If a level flight is intended but the nose of the aircraft is high, gravity will act upon the weighted assembly and will cause the ball 39 to roll on the surface of the plate 41 and the weighted assembly will assume the position indicated by the dotted lines A in Figure 4. This movement of the assembly will cause the indicator element to move upwardly with respect to the horizontal center of the cover 15 to the position A'. As the assembly swings forwardly within the instrument due to the ball 39 rolling on the surface of the plate 41, the ball 39 will gradually extend itself with respect to the housing 35, that is, the ball will move outwardly with respect to the housing. This is true because the radius of the upper surface of the plate 41 is greater than the distance from the center of the plate to the gimbal ring arrangement which is the pivot point of the weighted assembly. The particular action of the weighted assembly results in an amplified indication by the indicator bar or element so that a relatively slight degree of inclination is indicated by a substantial movement of the indicating bar or element.

The action of the weighted assembly which includes the housing 35 and ball 39 as it imparts an amplified movement to the indicator bar 18 is clearly illustrated in the schematic diagram shown in Figure 9. In this figure the upper surface of the plate 41 is swung on a radius having the center point at P which is a considerably larger radius than the distance between the center of the plate 41 and the gimbal pivot point G. When the indicator 18 is at the horizontal center of the cover 15 the ball 39 is at the center of the plate 41. If the nose of the aircraft is inclined upwardly a predetermined number of degrees illustrated by the angle Q, the weighted assembly which includes the ball 39 will move through a much greater angle which is indicated by R. Assuming the angle Q to be 15° and assuming that the radius of the plate is three times that between the gimbal pivot G and the ball 39 when the latter is at the center of the disk, then a 15° inclination of the aircraft will result in a movement of the weighted assembly and ball 39 through an angle of approximately 45°. Thus, the indicating element 18 is moved three times as far as it would move if there were a straight one to one ratio between the angle of inclination of the aircraft and the angle of movement of the weighted assembly. In this manner an amplified indication is given so that very slight angles of inclination of the aircraft will result in an appreciable indication by the indicating bar or element. This is one of the features of the invention since it provides for the required sensitivity of the indicator to immediately advise the pilot of improper flight positions.

In indicating a nose low position, that is, with the aircraft in level flight and the nose low, the action is the same except that gravity will cause the weighted assembly, including the ball 39, to move to the dotted line position B in Figure 4. Such movement of the assembly will cause the indicator 18 to move downwardly below the horizontal center of the cover 15 to the position B'.

Since the weighted assembly is acted upon by gravitational force, the assembly will be maintained in a substantially vertical position unless the gravity acting thereon is overcome by centrifugal forces which may be acting on the aircraft in flight. In level flight, the ball remains at the center of the plate 41 and since the plate is concavo-convex and also since the assembly is universally mounted it is apparent that said assembly may move in any direction with respect to the center. Thus, if level flight is attempted with either one or the other wings low, the ball 39 will move off center and will cause a rotation of the indicator bar about its horizontal axis to provide an indication such as is shown in Figures 11 and 12, the indication depending upon which wing of the aircraft is low.

In addition to indicating the wing high, the wing low, nose high or nose low positions, the element or bar 18, due to its particular mounting and control by the weighted assembly, will also indicate improper turn or bank of the aircraft. When the aircraft is properly turned, the centrifugal force acting upon the weighted assembly will overcome the gravitational force normally acting on said assembly and thus the element will remain in a stationary position with respect to the casing; therefore, during a proper turning maneuver, all parts will remain in their same relative positions within the instrument casing and the indication will be as shown in Figure 13, with the indicator bar aligned with the horizontal center of the cover 15. In the case of an improper turn, the centrifugal force acting upon the aircraft will not be through the vertical axis of the plane with the result that the weighted assembly and indicating element attached thereto will not maintain its normal position with respect to the instrument casing and cover. In such event, shifting of the weighted assembly by the forces acting thereon will cause a swinging of the indicator bar about the horizontal axis and this will move the indicating element out of alignment with the horizontal center of the cover or dial. Such misalignment will be an indication similar to that shown in Figures 11 and 12 and will indicate either that the aircraft is skidding or slipping in the turn.

So long as the aircraft is flown properly, whether in straight flight, climbing, diving or turning, the forces acting on the weighted assembly will be through the axis of said aircraft and said weight will remain in a normal stationary position to maintain the element or bar 18 at the horizontal center of the cover in alignment with the reference lines 19. At any time that the flight position is improper regardless of the particular maneuver being executed the forces acting on said weighted assembly cause it to move from a normal center position on the supporting plate 41 and the relative position of the indicating element with respect to the center line of the cover is varied to indicate such improper flight.

The device is relatively simple in construction and comprises a minimum number of parts. The particular arrangement of employing the curved or dished supporting plate 41 in conjunction with the weighted ball 39 having movement with respect to the housing 35 provides for a very sensitive operation of the indicator. As has been explained, only a slight indication of the aircraft will result in a very appreciable movement of the indicator bar so that actually the movement of said bar is amplified. This amplified movement of the indicator occurs also in turns to indicate slipping or skidding of the aircraft so that only a very slight skid or slip will be indicated by a substantial movement of the indicator bar. The sensitivity of the instrument is important because it immediately advises the pilot of an improper flight position of the aircraft.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An aircraft instrument including, a housing having a chamber therein defined in part by a transparent cover member, a support within said chamber, an assembly suspended from the support for universal movement within the housing, an indicating bar visible through the transparent cover member secured to the upper portion of the assembly, a weighted element confined by the lower portion of the assembly and movable longitudinally thereof, a concavo-convex supporting surface within the lower portion of the chamber and having the weighted element of the assembly riding thereon, the radius of the curvature of said concavo-convex supporting surface being greater than the distance between the center point of said surface and the point of suspension between the assembly and its support, whereby the weighted element and assembly and the indicator bar attached thereto travel through a greater number of degrees than the degree of actual inclination of the instrument when the same is tilted from true vertical during flight of the aircraft in which the instrument is mounted, thereby resulting in an amplified movement of the indicator bar.

2. An instrument as set forth in claim 1, wherein the weighted element and assembly are responsive to forces acting on said aircraft in flight and wherein said assembly is normally in alignment with the vertical axis of the instrument and aircraft when said aircraft is in a correct flight position, the connection between said assembly and the indicator bar being such that when said assembly is in a normal vertical aligned position, said indicator bar is disposed in alignment with the horizontal center of the transparent cover of the instrument to indicate correct flight attitude of the aircraft.

3. An instrument as set forth in claim 1, wherein the suspension of the assembly is accomplished by a gimbal ring pivotally attached to the support, and a gimbal disk secured to the upper end of the assembly and pivotally attached to the gimbal ring, the axis of the pivots between said disk and ring being at a right angle to the axis of the pivots between the ring and support.

4. An aircraft instrument including, a housing having a chamber therein with the front portion closed by a transparent wall, a pendulous assembly suspended within the chamber for universal movement therein, an indicating element attached to the assembly and visible through the transparent wall of the chamber, said element being capable of a swinging movement above and below the horizontal center of the instrument and also being capable of a rotative movement about a horizontal axis when the pendulous assembly is swung, a movable weighted member having an extensible connection with the lower end of the assembly for controlling the swinging movement thereof in accordance with the gravitational and other forces acting upon the weighted member, and a concave guide surface within the chamber upon which the weighted member is movable, the curvature of said surface being disposed on a radius which is greater than the radius of the circle through which the pendulous assembly may swing, whereby a movement of the weighted member through a predetermined number of degrees results in a greater movement of the assembly and an amplified movement of the indicating element connected to said assembly.

5. An aircraft instrument as set forth in claim 4, wherein the plane of suspension of the assembly and the connection of the indicating element to said assembly is so located with respect to the chamber and housing that when the aircraft in which the instrument is mounted is in level flight, the indicating element is in a normal position aligned with the horizontal center line of said chamber and housing.

6. An aircraft instrument as set forth in claim 4, wherein the weighted element is a ball and wherein the extensible connection with the pendulous assembly comprises a tubular socket forming part of the assembly and within which the ball may telescope.

7. An aircraft instrument as set forth in claim 4, wherein the weighted element is a ball and wherein the extensible connection with the pendulous assembly comprises a tubular socket forming part of the assembly and within which the ball may telescope, and also wherein the guide surface is formed by a concavo-convex plate having the center point from which its curvature is swung disposed in a plane above the plane in which the point of suspension of the pendulous assembly is located.

OLIVER V. PHILLIPS.

REFERENCES CITED

The following references are of record in the file of this patent:

UNITED STATES PATENTS

| Number | Name | Date |
| --- | --- | --- |
| 1,297,504 | Skulina | Mar. 18, 1919 |
| 1,935,740 | Gette, Jr. | Nov. 21, 1933 |
| 1,944,619 | Urfer | Jan. 23, 1934 |
| 1,948,030 | Goldsworthy | Feb. 20, 1934 |

FOREIGN PATENTS

| Number | Country | Date |
| --- | --- | --- |
| 118,540 | Great Britain | Feb. 11, 1918 |
| 138,031 | Great Britain | 1920 |
| 259,479 | Germany | 1913 |
| 510,700 | France | 1919 |
| 712,369 | France | 1931 |